(12) United States Patent
Teh et al.

(10) Patent No.: US 9,189,426 B2
(45) Date of Patent: Nov. 17, 2015

(54) PROTECTED ACCESS TO VIRTUAL MEMORY

(75) Inventors: Chee Hak Teh, Bayan Lepas (MY); Weng Li Leow, Bukit Mertajam (MY); Alok K. Mathur, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 13/536,515

(22) Filed: Jun. 28, 2012

(65) Prior Publication Data

US 2014/0006737 A1    Jan. 2, 2014

(51) Int. Cl.
*G06F 12/14* (2006.01)
*G06F 12/10* (2006.01)

(52) U.S. Cl.
CPC .......... *G06F 12/1475* (2013.01); *G06F 12/109* (2013.01)

(58) Field of Classification Search
CPC ....................................................... G06F 12/14
USPC ......................................................... 711/163
See application file for complete search history.

(56) References Cited

U.S. PATENT DOCUMENTS

2011/0145542 A1* 6/2011 Morrow .................... 711/207

* cited by examiner

*Primary Examiner* — Yong Choe
(74) *Attorney, Agent, or Firm* — Schwabe, Williamson & Wyatt, P.C.

(57) ABSTRACT

Embodiments of techniques and systems for protected access to virtual memory are described. In embodiments, a protected memory management architecture ("PMMA") may be configured to control accesses to protected physical memory. The PMMA may provide a protected virtual memory window for dynamic allocation of protected memory regions. During forward translation of virtual memory addresses, the PMMA may check a region ID of a process before allowing access. During reverse translation of a physical memory address, the PMMA may prevent accesses to protected physical memory addresses. The PMMA may also dynamically allocate physical memory to protected memory regions in virtual memory and may authenticate the physical memory as available before allocation. Other embodiments may be described and claimed.

29 Claims, 10 Drawing Sheets

Protected Memory Management Architecture 100

PROTECTED ACCESS TO VIRTUAL MEMORY

BACKGROUND

Many computing devices interact with one or more media devices, often using one or more streaming media drivers ("SMDs"). Oftentimes, these SMDs utilize memory buffers for actions such as media capture, decoding, processing, and display. In some systems, for security purposes, SMD buffers may be aware of and able to directly access physical memory. However, SMDs may need large blocks of contiguous addresses for easier streaming and security purposes. In some such systems, this physical memory may end up being allocated prior to OS boot as a single large block, from which individual SMDs buffers can be cut out as needed during operation of the device. Use of this technique may result, however, in large pieces of memory being wasted, since it may not be known at boot time how much memory will or will not be used.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As may be used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
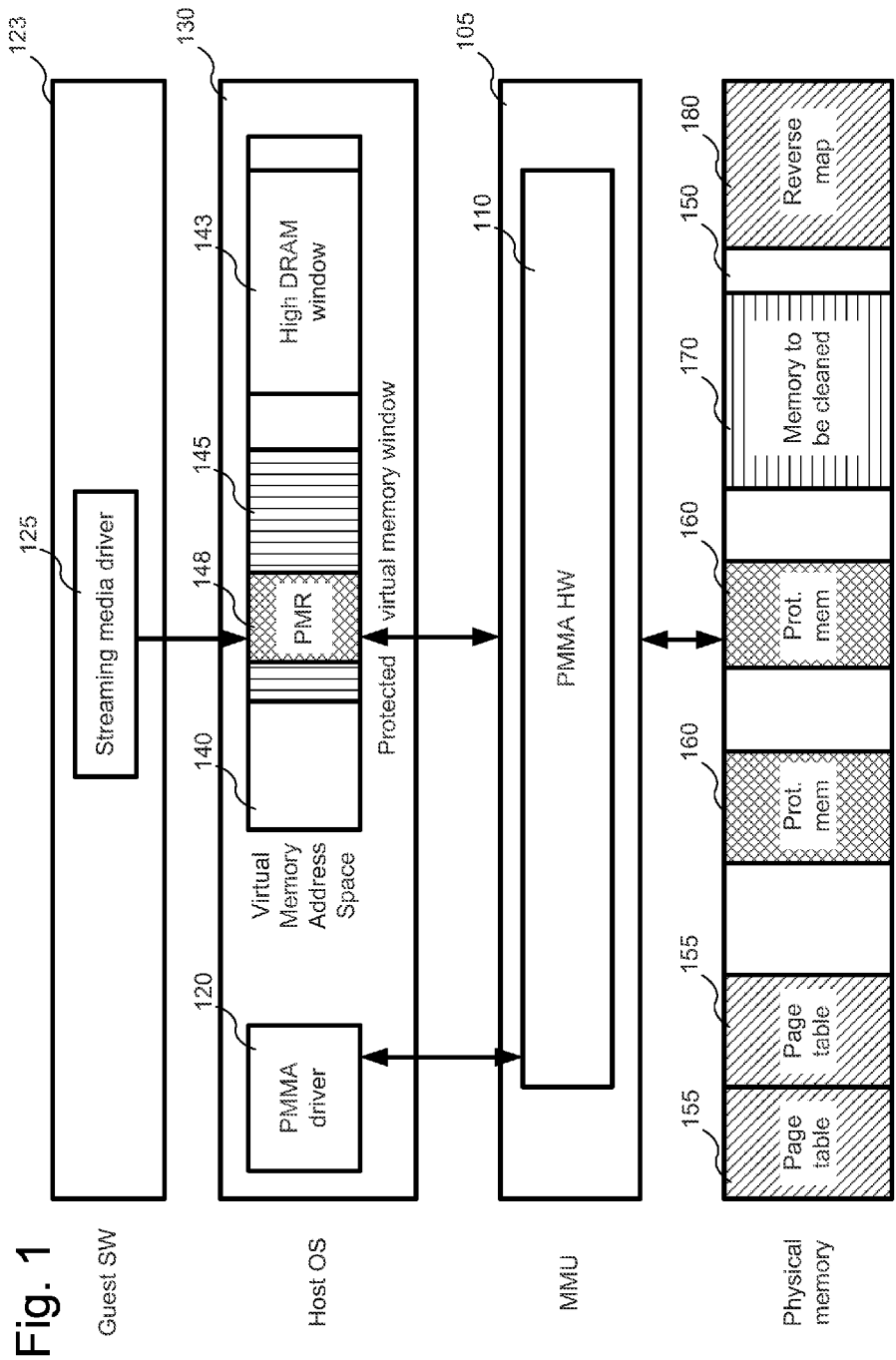
FIG. 1 is a block diagram illustrating an example protected memory management architecture, in accordance with various embodiments.

Referring now to FIG. 1, an example protected memory management architecture 100 ("PMMA 100") is illustrated. In various embodiments, the PMMA 100 may include PMMA hardware 110 ("PMMA HW 100"), which may operate in a memory management unit 105 ("MMU 105"). In various embodiments, the PMMA 100 may include a PMMA driver 110, which may operate as software in host operating system ("host OS") 130. In various embodiments, the PMMA 100, through operation of the PMMA HW 110 and PMMA driver 120, may operate to allow for dynamic allocation and protection of a physical memory 150 that is accessed through a virtual memory address space 140 in the host OS 130.

In various embodiments, the PMMA 100 may provide for various structures in both the virtual memory address space 140 and the physical memory 150. For example, in various embodiments, the PMMA 100 may provide for the creation of protected virtual memory address regions ("PMRs") (such as, for example, PMR 148). PMR 148 may include a series of contiguous virtual memory addresses in a virtual memory address space 140. Additionally, the PMMA 100 may reserve a protected virtual memory window 145 ("PVMW 145", illustrated using horizontal lines) out of the virtual memory address space 140 for placement of these PMRs 148. Thus, when an SMD requires space for a buffer, the PMMA may operate to reserve a PMR 148 in the PVMW 145, and allow for protected memory operations within that PMR 148. In some embodiments, the PMMA 100 may also provide a high DRAM window 143 that may lie higher in the virtual memory address space 140. This window may provide additional virtual memory addresses that be mapped to physical memory space that would otherwise be mapped to by the reserved PVMW 145. This high DRAM window may, in various embodiments, be used for operations of the host OS 130. The use of the high DRAM window 143 may allow more of the physical memory 150 to be utilized than would be if a portion of the physical memory were only mapped to by the reserved PVMW 145.

The PMMA 100 may also utilize one or more structures in the physical memory 150. For example, the PMMA 100 may utilize one or more page tables 155, which may include mappings between addresses in the virtual memory address space 140 and addresses in the physical memory 150. While the page tables 155 are pictured in FIG. 1 as single entities for the sake of illustration, in various embodiments the page table 155 may include multiple components. For example, the page tables 155 may include a single-level page table, or a multiple-level page table (such as, for example, a directory table that points to one or more page tables). In various embodiments, page tables 155 may hold additional information, such as security attributes (e.g. region IDs) that are used to determine permitted accesses to a particular virtual memory address. The page tables 155 may also hold, for example, information indicating whether access to a virtual memory address is read-write or is read-only.

Protected memory operations may, in various embodiments, be facilitated by the PMMA HW 110 using the page table 155. In various embodiments, a first type of protected operation may be referred to as "forward translation." In forward translation, and as described in greater detail below, when a process and/or device seeks to access memory located at a virtual memory address that is found in the PVMW 145, the PMMA HW 110 may check to see if such access is permitted for the process. This check may be based, in various embodiments, on a security attribute such as a region ID that may be associated with the virtual memory address, such as in page table 155. If the access is permitted, the PMMA HW 110 may translate the virtual memory address to a physical memory address using page table 155 and allow the access. If the access is not permitted, an error or a dummy value may be returned.

In various embodiments, the PMMA 100 may create one or more pages of protected physical memory 160 in the physical memory 150. The PMMA 100 may be configured to dynamically acquire and map these pages to one or more PMRs 148 through the page tables 155. These pages of protected physical memory 160 may, in some embodiments, be sized as 4 KB pages; in other embodiments, other page sizes may be used. In various embodiments, the pages of protected physical memory 160 may be protected from access by the PMMA HW 110, as described in greater detail below. In various embodiments, and as described below, these pages or protected memory 160 may be authenticated by the PMMW HW 110 before being mapped.

In various embodiments, a second type of protected memory operation may be referred to as "reverse translation." In reverse translation, and as described in greater detail below, when a process tries to access a physical memory address, the PMMA HW 110 may control that access. Thus, in various embodiments, the PMMA HW 110 may refer to a reverse map 180, which may be maintained in the physical memory 150, to determine if the physical memory address is located in a page of protected physical memory 160. If it the address is in a protected page, the PMMA HW 110 may prevent direct access to the memory at that physical address.

In various embodiments, the physical memory 150 may also include one or more regions of memory to be cleaned 170. For example, the PMMA HW 110 may receive an indication that an SMD 125 has ceased execution and no longer needs a particular page of protected physical memory 160. In various embodiments, the PMMA HW 110 may record an indication that the page of protected physical memory 160 should be cleaned before returning the page to be used as free memory. In various embodiments, this indication may also be recorded in the reverse map 180. In other embodiments, cleanliness information may be maintained elsewhere; for example, a super page map (not illustrated) may be maintained to maintain cleanliness information about multiple pages of physical memory for faster lookup. In various embodiments, this cleaning may prevent sensitive information from being accessible to non-trusted devices or processes.

Figure 2:
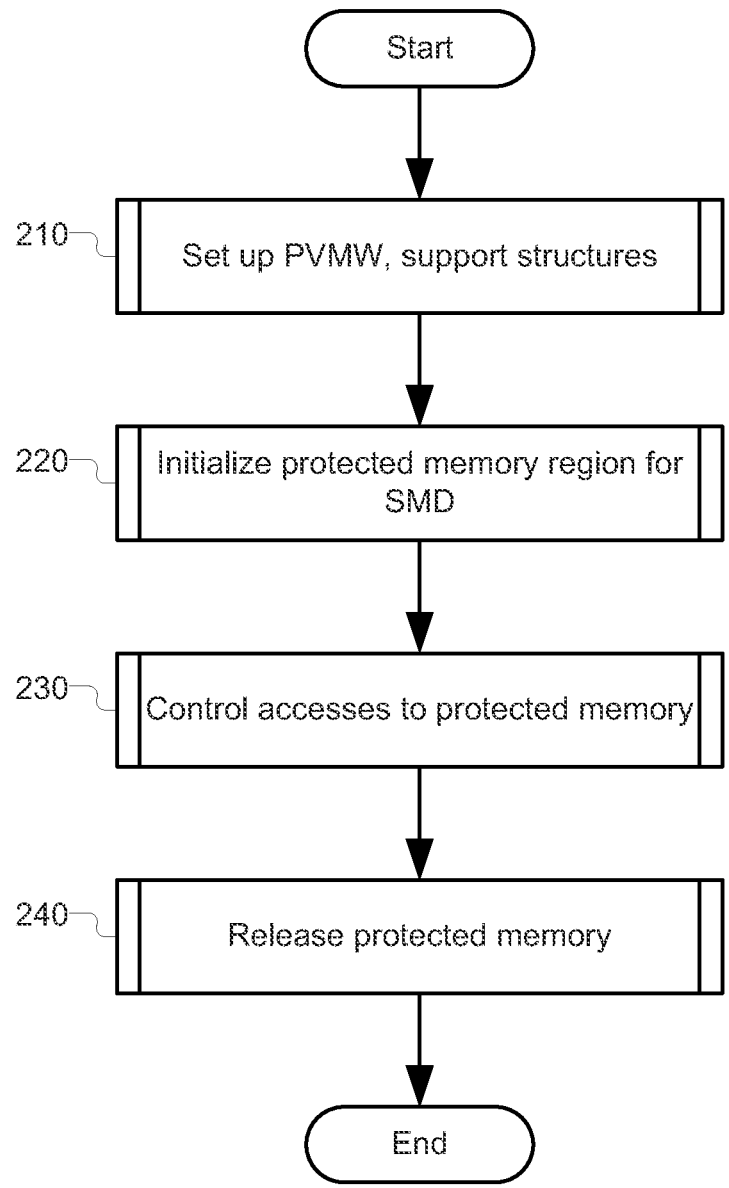
FIG. 2 illustrates an example protected memory management usage process, in accordance with various embodiments.

FIG. 2 illustrates an example protected memory management usage process 200, in accordance with various embodiments. It may be recognized that, while the operations of process 200 are arranged in a particular order and illustrated once each, in various embodiments, one or more of the operations may be repeated, omitted, or performed out of order. The process may begin at operation 210, where the PMMA 100 may set up the PVMW 145 as well as support structures. For example, the PMMA 100 may set up one or more page tables 155, the reverse map 180, and the clean map 190. Particular embodiments of operation 210 are described below with reference to process 300 of FIG. 3. Next, at operation 220, the PMMA 100 may initialize one or more protected memory regions 148, such as in response to an SMD requesting a PMR 148 for a memory buffer. Particular embodiments of operation 230 are described below with reference to process 400 of FIG. 4. Next, at operation 230, the PMMA 100 may control one or more accesses to protected memory, such as in the one or more PMRs 148. In various embodiments, the accesses may be one or more forward translations or reverse translations, as described herein. Particular embodiments of operation 230 are described below with reference to process 700 of FIG. 7 and process 800 of FIG. 8. At operation 240, the PMMA 100 may release protected memory. Particular embodiments of operation 210 are described below with reference to process 900 of FIG. 9. The process may then end.

Figure 3:
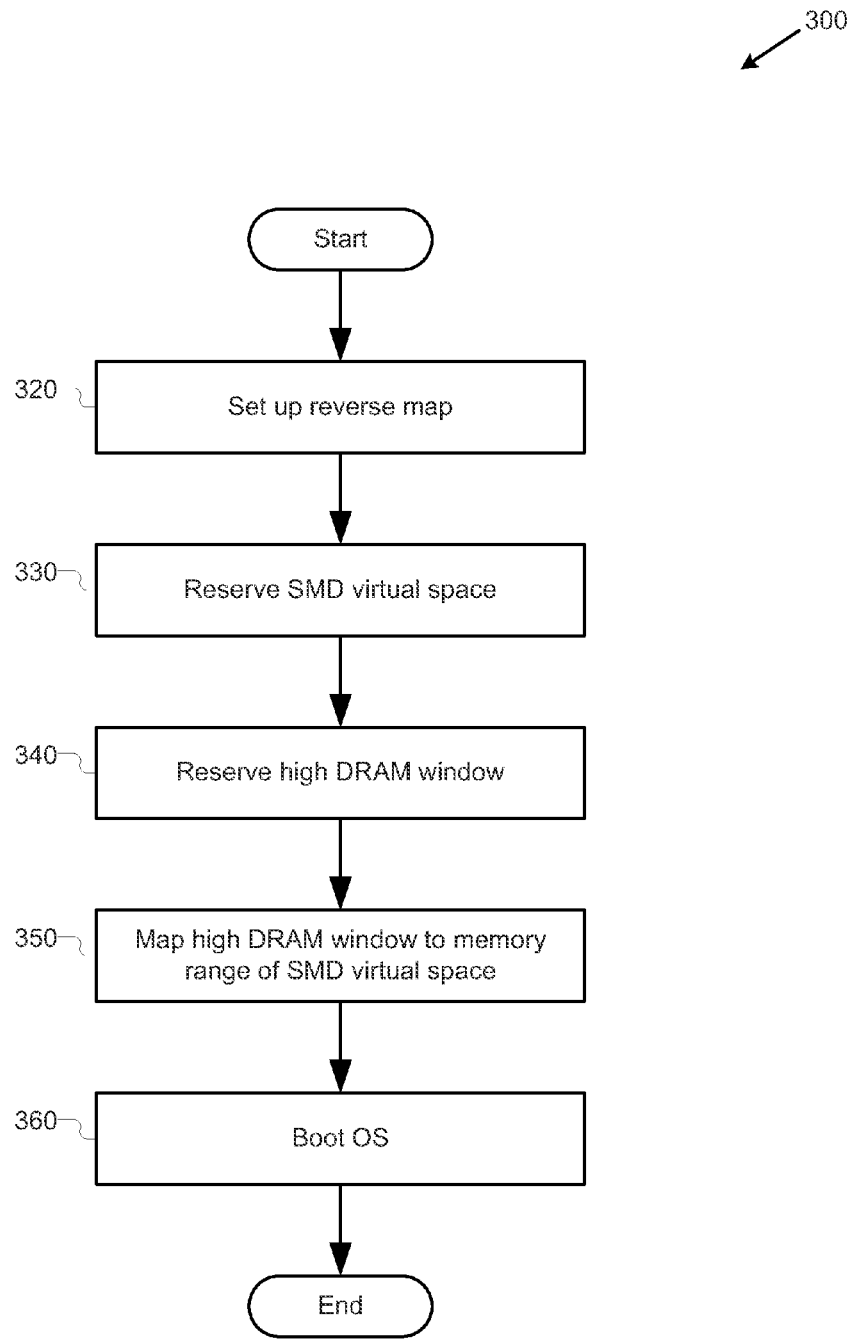
FIG. 3 illustrates an example protected memory management set up process, in accordance with various embodiments.

FIG. 3 illustrates an example protected memory management set up process 300, in accordance with various embodiments. In various embodiments, process 300 may include one or more embodiments of operation 210 of process 200. It may be recognized that, while the operations of process 300 are arranged in a particular order and illustrated once each, in various embodiments, one or more of the operations may be repeated, omitted, or performed out of order. The process may begin at operation 320, where the PMMA HW 110 may set up the reverse map 180 in a stolen region of the physical memory 150. In various embodiments, the region of physical memory 150 may be referred to as "stolen" because the PMMA HW 110 may prevent accesses to the region by other processes in order to protect the integrity of the reverse map 180. In various embodiments, the reverse map 180 may be set up to maintain an indication, for each page of physical memory covered by the reserve map 180, of whether the page of physical memory is protected or not. In various embodiments, the reverse map 180 may also be set up to maintain an indication, for each page of physical memory covered, of whether the physical page is mapped to by virtual memory addresses or not. Thus, in some embodiments, if the reverse map 180 indicates that a page of physical memory is no longer mapped to, but is protected, the PMMA HW 110 may understand that the page is a region of memory to be cleaned 170. Next, at operation 330, the PMMA driver 120 may reserve a portion of the virtual memory address space 140 as the PVMW 145. In various embodiments, the PMMA driver 120 may reserve the portion of the virtual memory address space 140 by interacting separately with a security processor. For example, a memory region may be setup by the PMMA driver 120 and locked by the security processor prior to allowing use of the portion of virtual memory. In various embodiments, by reserving the PVMW 145, the addresses included therein may be considered available only for use by one or more PMRs 148.

Next, at operation 340, the PMMA driver 120 may create an additional high DRAM window 143. In some embodiments, the high DRAM window 143 may be the same size as the PVMW 145; in others, the high DRAM window may be a different size. In various embodiments, the high DRAM window may be placed high in a DRAM space of the virtual memory address space such that the host OS 130 may see the memory addressed by the high DRAM window 143 as additional DRAM to use for host OS processes. Next, at operation 350, the PMMA HW 110 may map the high DRAM window to a memory range that would be otherwise used by the PVMW 145 in order to populate memory behind the PVMW 145. Next, at operation 360, the PMMA 100 may allow the host OS to boot. The operation may then end.

Figure 4:
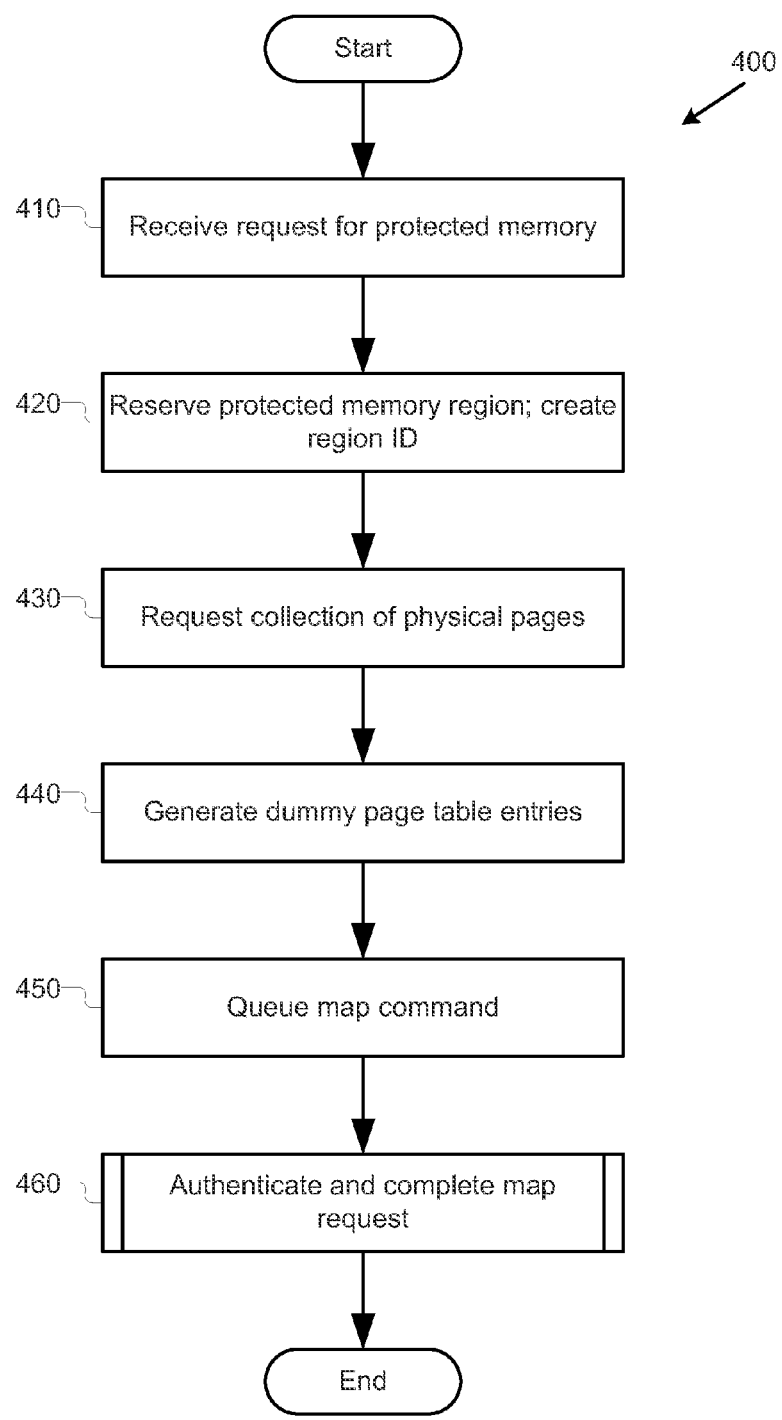
FIG. 4 illustrates an example protected memory region initialization process, in accordance with various embodiments.

FIG. 4 illustrates an example protected memory region initialization process 400, in accordance with various embodiments. In various embodiments, process 400 may include one or more embodiments of operation 220 of process 200. It may be recognized that, while the operations of process 400 are arranged in a particular order and illustrated once each, in various embodiments, one or more of the operations may be repeated, omitted, or performed out of order. The process may begin at operation 410, where the PMMA driver 120 may receive a request for protected memory, such as from an SMD 125. Next at operation 420, the PMMA driver 120 may reserve a PMR 148 out of the PVMW 145. The PMMA driver 120 may also generate a region ID for the PMR 148 at this time. Next, at operation 430, the PMMA driver 120 may request a collection of pages of physical memory. At operation 440, the PMMA driver 120 may then populate a set of dummy page table entries to be included in the page table based on the requested collection of pages of physical memory. In various embodiments, the dummy page tables may be set up first in a temporary physical location before begin processed by the PMMA HW at later operations.

Figure 5A:
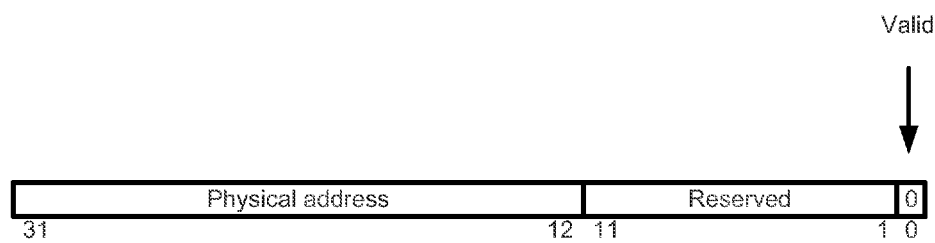
FIGS. 5A and 5B illustrate an example dummy page table entry and an example page table entry, in accordance with various embodiments.
Figure 5B:

Referring now to FIG. 5A, an example dummy page table entry is illustrated. As shown in the illustrated 32-bit example, a dummy page table entry may include a physical address (here located at bits 12-31), a reserved space (bits 1-11) and a valid bit (bit 0). The physical address may be added to the dummy page table entry during operation 430 by the PMMA driver, using an address received after request of the pages of physical memory. The valid bit may, in various embodiments, be given the value 0 by the PMMA driver 120 to indicate that the dummy page table entry is not a complete entry.

Returning to process 400, at operation 450, the PMMA driver 120 may queue a map command to be completed by the PMMA HW 110. In various embodiments, the map command may include one or more of: the generated dummy page tables, references to the dummy page tables, and the previously-created region ID. Then, at operation 460, the PMMA HW 110 may authenticate the received pages of physical memory and complete the map request. In various embodiments, the PMMA HW 110 may be configured to complete the map request by performing authentication and mapping of the PMR 148 to the received pages of protected memory. By locating this operation at the PMMA HW 110, the PMMA 100 may ensure that the trusted PMMA HW 110 can prevent untrusted physical memory from being mapped to the PMR 148. Particular embodiments of operation 460 are described below with reference to process 600 of FIG. 6. The process may then end.

Figure 6:
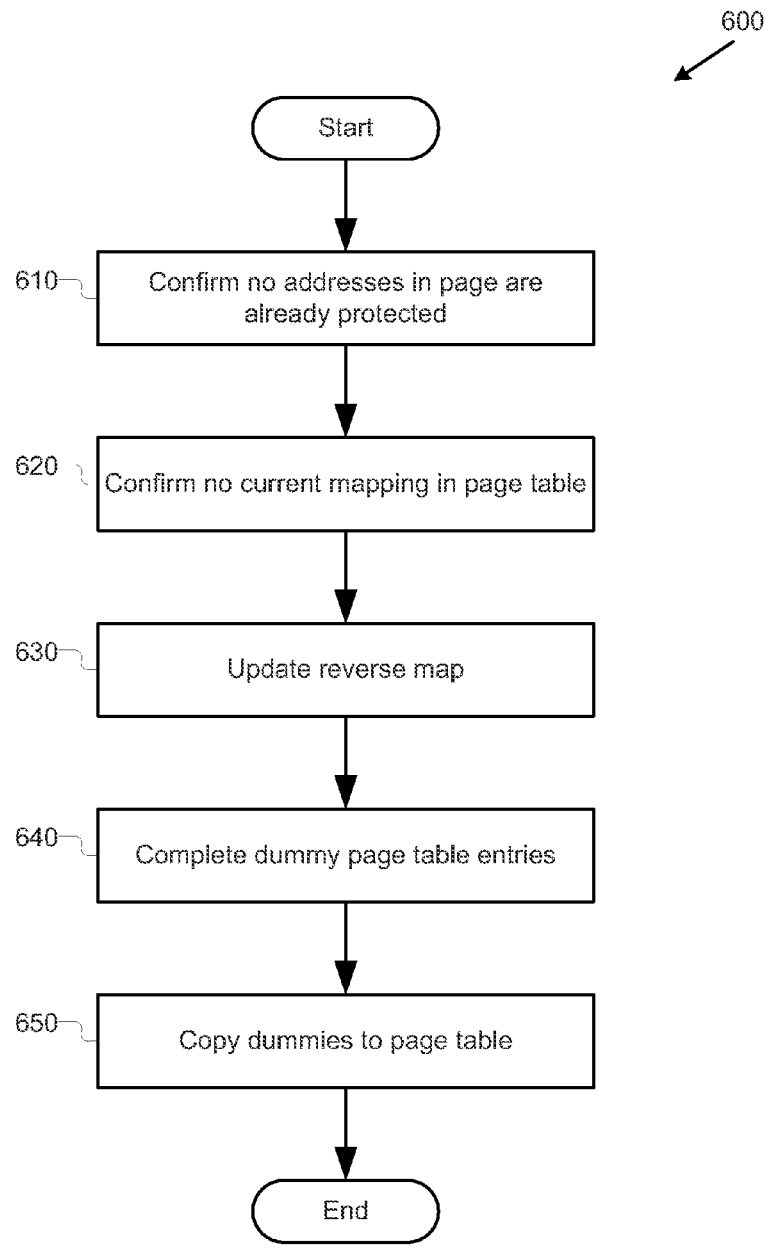
FIG. 6 illustrates an example map request authentication process, in accordance with various embodiments.

FIG. 6 illustrates an example map request authentication process 600, in accordance with various embodiments. In various embodiments, process 600 may include one or more embodiments of operation 460 of process 400. It may be recognized that, while the operations of process 600 are arranged in a particular order and illustrated once each, in various embodiments, one or more of the operations may be repeated, omitted, or performed out of order. While FIG. 6 refers to the authentication and mapping of a single physical page, in various embodiments multiple pages may be processed during operation of process 600.

The process may begin at operation 610, where the PMMA HW 110 may confirm that no addresses in the page are already protected, such as by referring to one or more entries in the reverse map 180. In various embodiments, if the page does have currently-protected addresses, the PMMA HW 110 may cease the authentication process and/or return an error. Next, at operation 620, the PMMA HW 110 may confirm that there is no current mapping to addresses in the page in the page table 155. In various embodiments, if the page is currently mapped to, the PMMA HW 110 may cease the authentication process and/or return an error. In various embodiments, by performing authentication at operations 610 and 620, the PMMA HW 110 may ensure that no protected data is accidentally mis-mapped or otherwise made available in unauthorized ways.

Next, at operation 630, the PMMA HW 110 may update the reverse map 180 to indicate that the page of physical memory is protected. In various embodiments, the PMMA HW 110 may perform this operation by recording an indication in one or more entries in the reverse map that correspond to the page of physical memory. Next, at operation 640, the PMMA HW 110 may complete the previously-created dummy page table entries for entry into the page table 155. Next, at operation 650, the dummy page table entries may be copied from their temporary memory locations into the page table. The process may then end.

Referring now to FIG. 5A, an example completed page table entry is illustrated. As shown in the illustrated 32-bit example, the completed page table entry may include the physical address (located at bits 12-31) that was previously included in the dummy page table. The completed page table entry may then be completed by the PMMA HW 110 to include additional information in the previously-reserved bits (bits 1-11). For example, the PMMA HW 110 may include information such as: the previously-generated region ID (bits 4-11), a protect bit (bit 3), and an access type (bits 1 and 2). In various embodiments, the protect bit may indicate that the page table entry points to protected physical memory. In various embodiments, the PMMA HW 110 may record whether the physical address is read-write or read-only. In various embodiments, the PMMA HW 110 may be further configured to modify this access type after mapping. In some embodiments, the PMMA HW 110 may be configured such that the access type may only be modified in one direction, such as from read-write to read-only. This may allow, for example, for writing of firmware code in a protected memory region, followed by an access type change to ensure the firmware code is not later changed.

Figure 7:
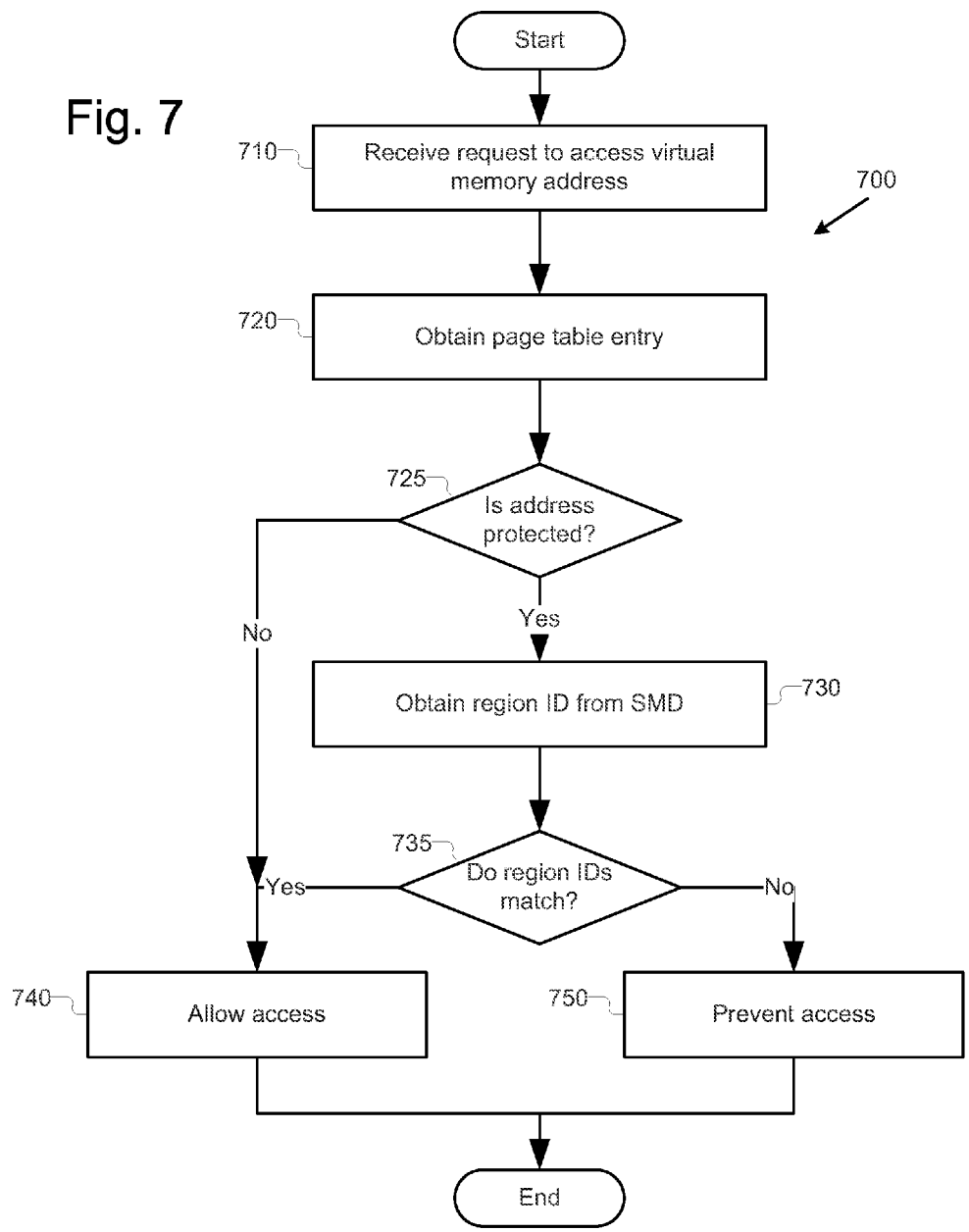
FIG. 7 illustrates an example forward translation process, in accordance with various embodiments.

FIG. 7 illustrates an example forward translation process 700, in accordance with various embodiments. In various embodiments, process 700 may include one or more embodiments of operation 230 of process 200. It may be recognized that, while the operations of process 700 are arranged in a particular order and illustrated once each, in various embodiments, one or more of the operations may be repeated, omitted, or performed out of order. The process may begin at operation 710, where the PMMA HW 110 may receive a request to access memory at a virtual memory address by a process, such as the SMD 125. At operation 720, the PMMA HW 110 may obtain a page table entry corresponding to the virtual memory address. As discussed above, in some embodiments, the PMMA HW 110 may perform a multiple-stage look up of the page table entry, such as using a directory table that points to a page table 155. Next, at decision operation 725, the PMMA HW 110 may determine if the virtual memory address maps to protected memory. If the virtual memory address does not map to protected memory, then at operation 740, the PMMA HW 110 may allow the access. In some embodiments, the PMMA HW 110 may also determine if the access is of a proper type (such as read-write vs. read only) and may allow or disallow the access accordingly (not illustrated). The process may then end.

If, at decision operation 725, the PMMA HW 110 determines that the address is protected, then at operation 730, the PMMA HW 110 may obtain a region ID from the requesting process, such as from the SMD 125, to check against the page table entry. Then, at decision operation 735, the PMMA HW 110 may determine whether the obtained region ID from the SMD 125 matches the region ID in the obtained page table entry. If the region IDs match, then at operation 740 the PMMA HW 110 may allow the access. As above, in some embodiments, the PMMA HW 110 may also determine if the access is of a proper type (such as read-write vs. read only) and may allow or disallow the access accordingly (not illustrated). If, at decision operation 735, the PMMA HW 110 determines that the region IDs do not match, the PMMA HW 110 may prevent access. In various embodiments, the PMMA HW 110 may prevent access by returning an error message; in other embodiments, the PMMA HW 110 may return a dummy or nonsense value. The process may then end.

Figure 8:
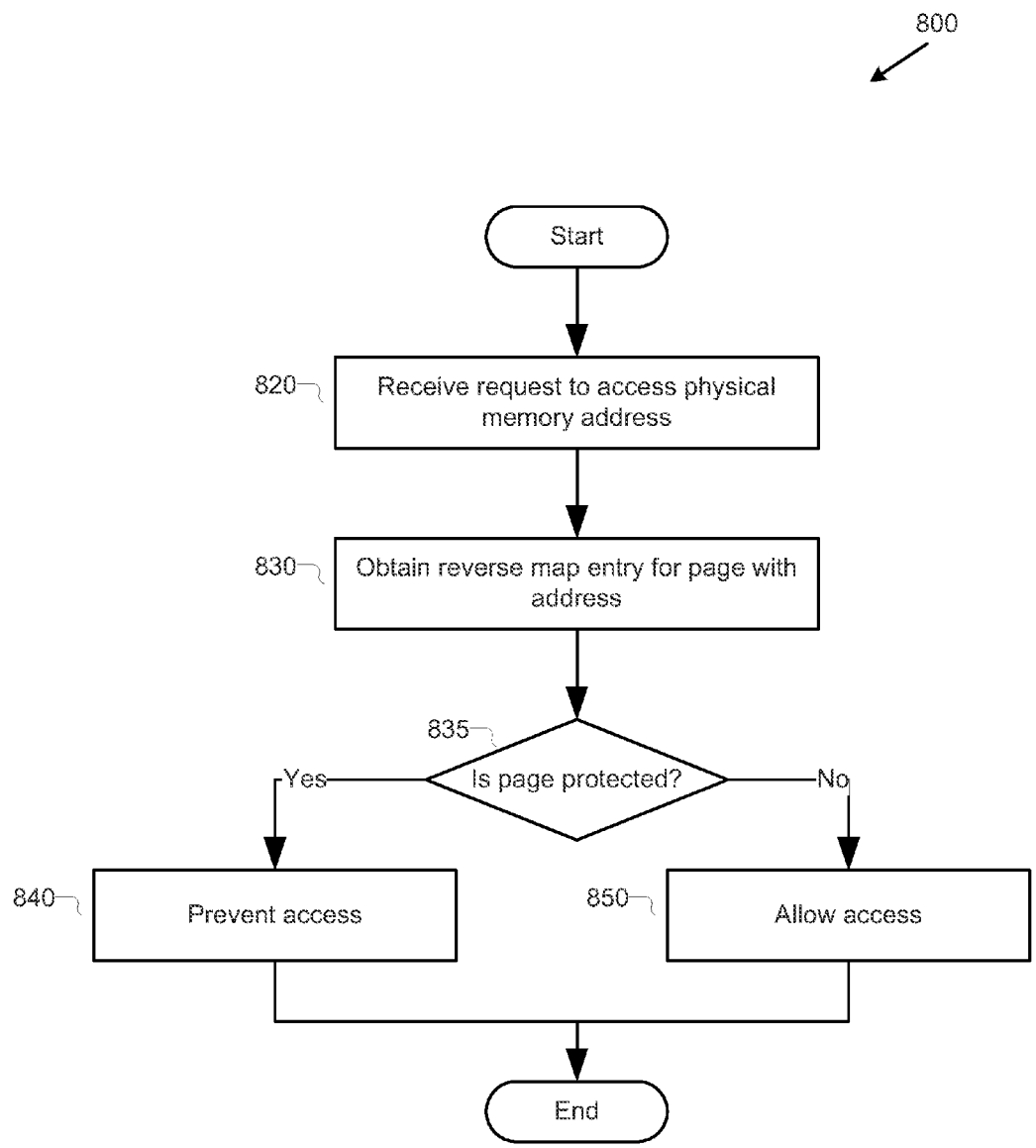
FIG. 8 illustrates an example reverse translation process, in accordance with various embodiments.

FIG. 8 illustrates an example reverse translation process 800, in accordance with various embodiments. In various embodiments, process 800 may include one or more embodiments of operation 230 of process 200. It may be recognized that, while the operations of process 800 are arranged in a particular order and illustrated once each, in various embodiments, one or more of the operations may be repeated, omitted, or performed out of order. The process may begin at operation 810, where the PMMA HW 110 may receive a request to access a physical memory address. At operation 820, the PMMA HW 110 may then obtain a reverse map entry corresponding to the address. In various embodiments, the reverse map entry may refer to different portions of physical memory. Thus, in various embodiments, the reverse map entry may be specific to a physical memory address, may be associated with a page of physical memory, or may be associated with more than one page of physical memory. In the illustrated example of FIG. 8, the reverse map entry is associated with a page of physical memory as an example.

At decision operation 835, the PMMA HW 110 may determine, based on the reverse map entry, whether the associated page is protected. If the page is not protected, then at operation 850, the PMMA HW 110 may allow the access. If the page is protected, however, then at operation 840 the PMMA HW 110 may prevent access. In either event, the process may then end.

Figure 9:
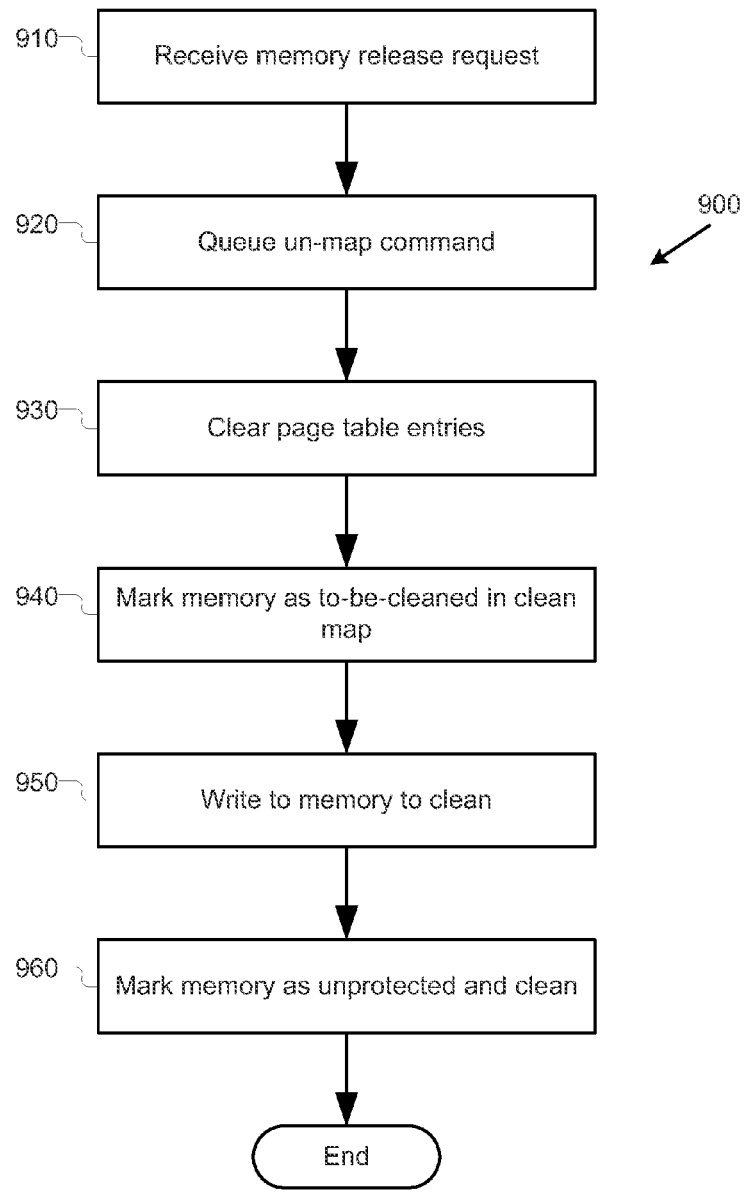
FIG. 9 illustrates an example protected memory region cleaning process, in accordance with various embodiments.

FIG. 9 illustrates an example protected memory region cleaning process 900, in accordance with various embodiments. In various embodiments, process 900 may include one or more embodiments of operation 240 of process 200. It may be recognized that, while the operations of process 900 are arranged in a particular order and illustrated once each, in various embodiments, one or more of the operations may be repeated, omitted, or performed out of order. The process may begin at operation 910, where the PMMA driver 120 may receive a request from a process, such as an SMD 125 to release a PMR 148. In some embodiments, rather than receive an explicit request, the PMMA driver 120 may determine that an SMD 125 has ceased execution and therefore does not need its associated PMR 148. Next, at operation 920, the PMMA driver 120 may queue an un-map command for processing by the PMMA HW 110. In various embodiments, the un-map command may include a region ID, one or more virtual addresses, and/or references to one or more page table entries associated with physical memory that the PMMA HW 110 may clean.

Next, at operation 920, the PMMA HW 110 may clear one or more page table entries corresponding to the PMR 148. This may, in various embodiments, remove mappings in the virtual memory address space 140 to the pages of protected physical memory 160 previously associated with the PMR 148. Next, at operation 940, the PMMA HW 110 may mark the memory in these pages of protected physical memory 160 as to-be-cleaned in the reverse map 180. In various embodiments, this may prevent further accesses to this protected memory and may mark it as memory to be cleaned 170.

In various embodiments, the PMMA HW 110 may then clean the memory to be cleaned 170. In some embodiments, because the memory to be cleaned is still protected from access, actual cleaning of the memory may be done at a lower priority than other memory operations, so as to avoid slow-down of these other memory operations. In other embodiments, the cleaning may happen directly from the marking of the memory to be cleaned 170. In either event, at operation 950, the PMMA HW 110 may write to the memory to be cleaned 170 in order to clean it. In various embodiments, the memory may be written to in various ways, such as with random values and/or constant values, and may be written to one or multiple times, depending on a desired level of security. Next, at operation 960, the PMMA HW 110 may mark the memory as unprotected and clean, such as by changing the associated entries in reverse map 180. The process may then end.

Figure 10:
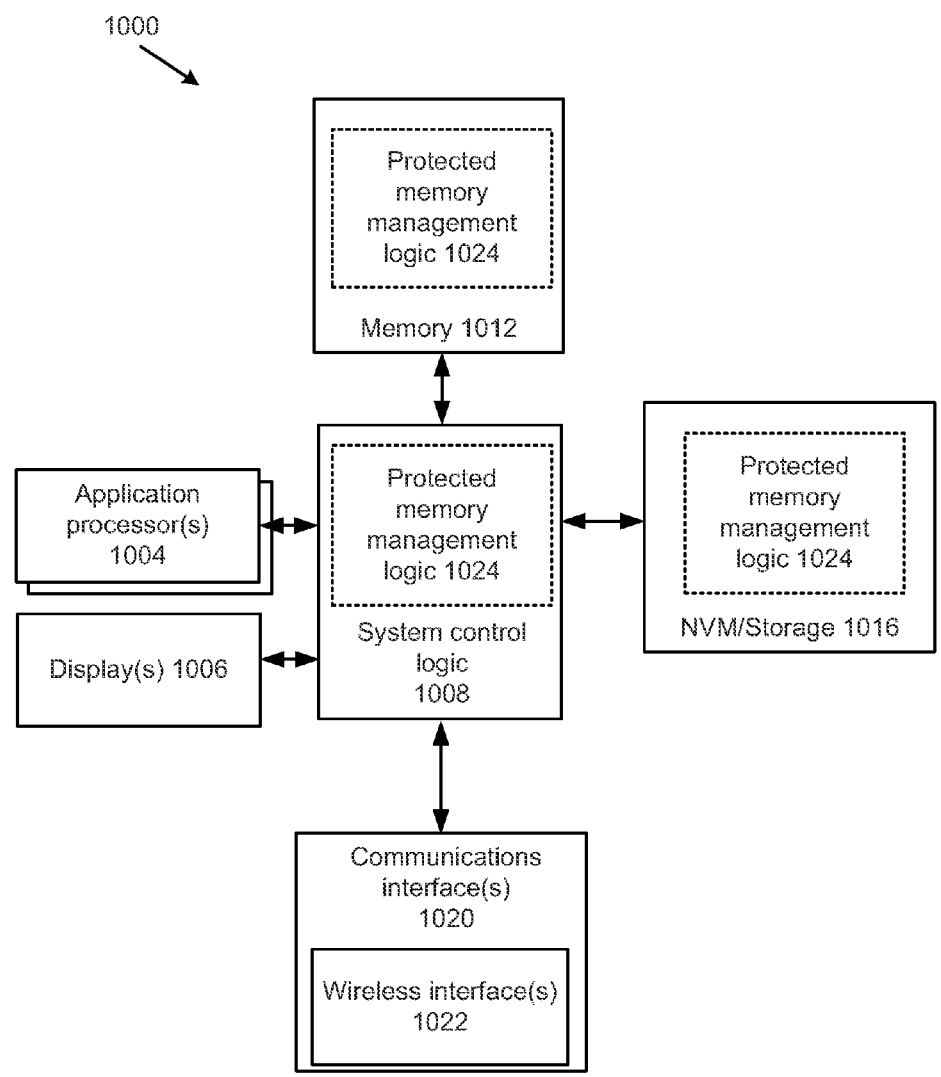
FIG. 10 illustrates an example computing environment suitable for practicing the disclosure, in accordance with various embodiments.

FIG. 10 illustrates, for one embodiment, an example computer system 1000 suitable for practicing embodiments of the present disclosure. As illustrated, example computer system 1000 may include control logic 1008 coupled to at least one of the processor(s) 1004, system memory 1012 coupled to system control logic 1008, non-volatile memory (NVM)/storage 1016 coupled to system control logic 1008, and one or more communications interface(s) 1020 coupled to system control logic 1008. In various embodiments, the one or more processors 1004 may be a processor core.

System control logic 1008 for one embodiment may include any suitable interface controllers to provide for any suitable interface to at least one of the processor(s) 1004 and/or to any suitable device or component in communication with system control logic 1008. System control logic 1008 may also interoperate with a display 1006 for display of information, such as to as user. In various embodiments, the display may include one of various display formats and forms, such as, for example, liquid-crystal displays, cathode-ray tube displays, and e-ink displays. In various embodiments, the display may include a touch screen.

System control logic 1008 for one embodiment may include one or more memory controller(s) to provide an interface to system memory 1012. System memory 1012 may be used to load and store data and/or instructions, for example, for system 1000. In one embodiment, system memory 1012 may include any suitable volatile memory, such as suitable dynamic random access memory ("DRAM"), for example.

System control logic 1008, in one embodiment, may include one or more input/output ("I/O") controller(s) to provide an interface to NVM/storage 1016 and communications interface(s) 1020.

NVM/storage 1016 may be used to store data and/or instructions, for example. NVM/storage 1016 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the communications interface(s) 1020.

System memory 1012, NVM/storage 1016, and system control logic 1008 may include, in particular, temporal and persistent copies of protected memory management logic 1024. The protected memory management logic 1024 may include instructions that when executed by at least one of the processor(s) 1004 result in the system 1000 practicing one or more of the protected memory management operations described above.

Communications interface(s) 1020 may provide an interface for system 1000 to communicate over one or more network(s) and/or with any other suitable device. Communications interface(s) 1020 may include any suitable hardware and/or firmware, such as a network adapter, one or more antennas, a wireless interface 1022, and so forth. In various embodiments, communication interface(s) 1020 may include an interface for system 1100 to use NFC, optical communications (e.g., barcodes), BlueTooth or other similar technologies to communicate directly (e.g., without an intermediary) with another device. In various embodiments, the wireless interface 1022 may interoperate with radio communications technologies such as, for example, WCDMA, GSM, LTE, and the like.

For one embodiment, at least one of the processor(s) 1004 may be packaged together with system control logic 1008 and/or protected memory management logic 1024. For one embodiment, at least one of the processor(s) 1004 may be packaged together with system control logic 1008 and/or protected memory management logic 1024 to form a System in Package ("SiP"). For one embodiment, at least one of the processor(s) 1004 may be integrated on the same die with system control logic 1008 and/or protected memory management logic 1024. For one embodiment, at least one of the processor(s) 1004 may be integrated on the same die with system control logic 1008 and/or protected memory management logic 1024 to form a System on Chip ("SoC").

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. A computer-implemented method for controlling access to protected memory, the method comprising:
   obtaining, by one or more memory management components of a computing device, a first security attribute for an agent requesting access to physical memory mapped to by a protected virtual memory address contained in a protected virtual memory address window;
   comparing, by the one or more memory management components, the first security attribute against a second security attribute associated with the protected virtual memory address; and
   when only the first and second security attributes are compatible, allowing, by the memory management component, the agent access to the physical memory.

2. The method of claim 1, further comprising, prior to a boot of an operating system on the computing device, reserving, by the one or more memory management components, the protected virtual memory address window.

3. The method of claim 2, further comprising, prior to the boot of the operating system, reserving physical memory for a reverse map.

4. The method of claim 2, further comprising, prior to the boot of the operating system, reserving a dynamic random-access memory window based on the size of the reserved protected virtual memory address window.

5. The method of claim 1, further comprising:
   receiving, by the one or more memory management components, a request for a region of protected virtual memory addresses;
   reserving, by the one or more memory management components, one or more addresses from the protected virtual memory address window as the region of protected virtual memory addresses;
   identifying, by the one or more memory management components, one or more pages of physical memory;
   mapping, by the one or more memory management components, addresses from the region of protected virtual memory addresses to one or more addresses in the pages of physical memory.

6. The method of claim 5, further comprising recording, by the one or more memory management components, an indication that addresses from the identified one or more pages of physical memory are protected physical memory addresses.

7. The method of claim 5, wherein:
   the method further comprises authenticating, by the one or more memory management components, the identified one or more pages of physical memory as able to be protected; and
   the mapping comprises selectively mapping the addresses when the one or more pages are authenticated.

8. The method of claim 7, wherein authenticating the one or more pages of physical memory comprises:
   determining whether addresses from the one or more pages of physical memory are currently protected; and determining whether addresses from the one or more pages of physical memory are waiting to be cleaned.

9. The method of claim 1, further comprising:
intercepting, by one or more memory management components, an access to a physical memory address;
obtaining, by the one or more memory management components, an indication of whether the physical memory address has been identified as a protected physical memory address; and
when the physical memory address has been identified as a protected physical memory address, preventing, by the one or more memory management components, access to memory at the physical memory address.

10. The method of claim 1, further comprising:
receiving, one or more memory management components, an indication that a region of protected virtual memory addresses may be released;
clearing a mapping, by the one or more memory management components, between the region of protected virtual memory addresses and one or more pages of protected physical memory addresses; and
cleaning, by the one or more memory management components, physical memory addresses from the one or more pages of protected physical memory addresses.

11. The method of claim 10, wherein cleaning comprises:
recording an indication that the physical memory addresses from the one or more pages of protected physical memory addresses are to be cleaned;
writing new data to the one or more physical memory addresses to clean the one or more physical memory addresses; and
recording an indication that the physical memory addresses are clean.

12. The method of claim 11, wherein writing new data comprises writing new data at a lower priority than other memory operations.

13. An system for controlling access to protected memory, the system comprising:
a physical computer memory;
a secure memory management architecture coupled to the physical computer memory and configured to:
receive a request for a region of protected virtual memory addresses;
reserve one or more addresses from the protected virtual memory address window as the region of protected virtual memory addresses;
identify one or more pages of physical memory;
authenticate the identified one or more pages of physical memory as able to be protected; and
when the one or more pages are authenticated, map one or more addresses from the protected virtual memory address window to one or more addresses in the pages of physical memory.

14. The system of claim 13, wherein the secure memory management architecture is further configured to record an indication that addresses from the identified one or more pages of physical memory are protected physical memory addresses.

15. The system of claim 13, wherein:
the secure memory management architecture is further configured to authenticate the identified one or more pages of physical memory as able to be protected; and
the secure memory management architecture is configured to map the one or more addresses if the identified one or more pages of physical memory are successfully authenticated.

16. The method of claim 15, wherein the secure memory management architecture is configured to authenticate the one or more pages of physical memory through:
determination of whether addresses from the one or more pages of physical memory are currently protected; and
determination of whether addresses from the one or more pages of physical memory are waiting to be cleaned.

17. The system of claim 13, wherein:
the secure memory management architecture comprises a secure memory management driver software executing on a computing processor and secure memory management hardware; and
the secure memory management driver software is configured to perform said receive and identify; and
the secure memory management hardware is configured to perform said authenticate and map.

18. The system of claim 13, wherein the secure memory management architecture is further configured to:
receive an indication that a region of protected virtual memory addresses may be released;
clear a mapping between the region of protected virtual memory addresses and one or more pages of protected physical memory addresses; and
clean physical memory addresses from the one or more pages of protected physical memory addresses.

19. The system method of claim 18, wherein the secure memory management architecture is configured to clean through:
recordation of an indication that the physical memory addresses from the one or more pages of protected physical memory addresses are to be cleaned;
a write of new data to the one or more physical memory addresses to clean the one or more physical memory addresses; and
recordation of an indication that the physical memory addresses are clean.

20. The system of claim 19, wherein the write of new data comprises a write of new data at a lower priority than other memory operations.

21. A secure memory management hardware component of a computing device configured to controlling access to a protected physical memory of the computing device, the secure memory management hardware component configured to operate to:
obtain a first security attribute for a device requesting access to the physical memory at a physical memory address mapped to by a protected virtual memory address contained in a protected virtual memory address window;
compare the first security attribute against a second security attribute associated with the protected virtual memory address; and
when only the first and second security attributes are compatible, allow the agent to access the physical memory.

22. The secure memory management hardware component of claim 21, wherein:
the secure memory management hardware component is further configured to, prior to a boot of an operating system on the computing device, reserve the protected virtual memory address window as well as physical memory for a reverse map.

23. The secure memory management hardware component of claim 21, wherein the secure memory management hardware component is further configured to:
receive a request to map one or more pages of physical memory to be mapped to a protected memory region;

authenticate the identified one or more pages of physical memory as able to be protected; and selectively map addresses from the region of protected virtual memory addresses to one or more addresses in the pages of physical memory based on whether the one or more pages of physical memory are authenticated as able to be protected.

24. The secure memory management hardware component of claim 23, wherein the secure memory management hardware component is configured to authenticate the one or more pages of physical memory through:

determination of whether addresses from the one or more pages of physical memory are currently protected; and determination of whether addresses from the one or more pages of physical memory are waiting to be cleaned.

25. The secure memory management hardware component of claim 21, wherein the secure memory management hardware component is further configured to:

intercept an access to a physical memory address;

obtain an indication of whether the physical memory address has been identified as a protected physical memory address; and when the physical memory address has been identified as a protected physical memory address, prevent access to memory at the physical memory address.

26. The secure memory management hardware component of claim 21, wherein the secure memory management hardware component is further configured, based on receipt of an indication that a region of protected virtual memory addresses may be released, to:

clearing a mapping between the region of protected virtual memory addresses and one or more pages of protected physical memory addresses; and clean physical memory addresses from the one or more pages of protected physical memory addresses.

27. The secure memory management hardware component of claim 21, wherein the secure memory management hardware component is configured to clean physical memory addresses through:

recordation of an indication that the physical memory addresses from the one or more pages of protected physical memory addresses are to be cleaned;

a write of new data to the one or more physical memory addresses to clean the one or more physical memory addresses; and recordation of an indication that the physical memory addresses are clean.

28. The secure memory management hardware component of claim 21, wherein the secure memory management hardware component is configured to write new data through a write of new data at a lower priority than other memory operations.

29. The secure memory management hardware component of claim 21, wherein the secure memory management hardware component operates as part of a memory management unit.

* * * * *